No. 851,058. PATENTED APR. 23, 1907.
J. L. M. BROOKS.
COUPLING FOR CONNECTING PLOWS TANDEM.
APPLICATION FILED DEC. 18, 1905.
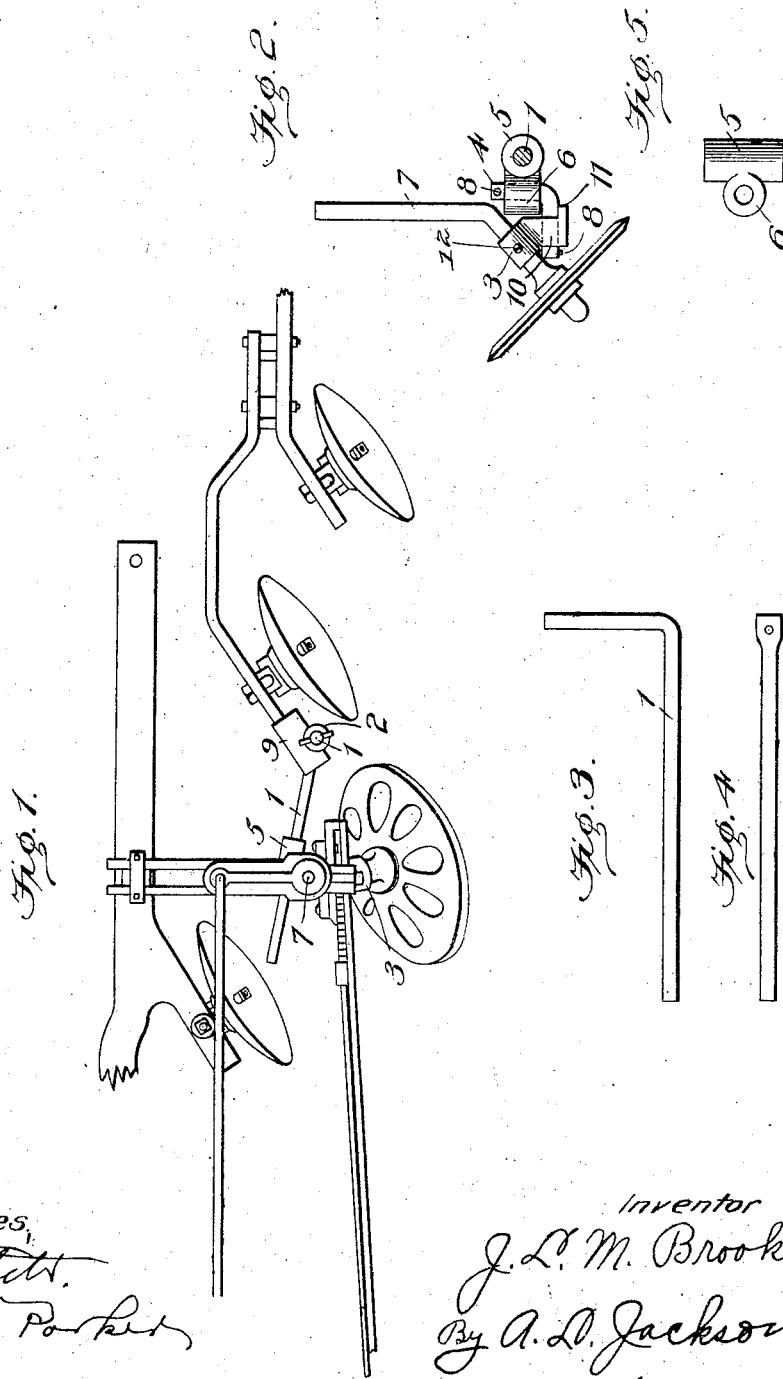
Witnesses,
Inventor
J. L. M. Brooks,
By A. D. Jackson,
Attorney.

UNITED STATES PATENT OFFICE.

JOHN L. M. BROOKS, OF BIRDVILLE, TEXAS.

COUPLING FOR CONNECTING PLOWS TANDEM.

No. 851,058.     Specification of Letters Patent.     Patented April 23, 1907.

Application filed December 18, 1905. Serial No. 292,322.

*To all whom it may concern:*

Be it known that I, JOHN L. M. BROOKS, a citizen of the United States, residing at Birdville, county of Tarrant, and State of Texas, have invented certain new and useful Improvements in Couplings for Connecting Plows Tandem, of which the following is a specification.

My invention relates to couplings for connecting plows together, one behind the other, or gangs of plows together, one gang behind the other, or a single plow to a gang of plows, with either the gang or the single plow in front; and the object is to provide a connection which will permit lateral and vertical rocking motion and which will permit a rocking motion of axle and which permits longitudinal motion of the connecting-rod, whereby the necessary flexibility is provided when several plows connected together tandem are to be turned, and which connection with the connecting-rod supports the rear end of the beam of the gang of plows in front and which will guide the plows and hold the frames or beams of plows in determined alinement, so that the plow or gang of plows behind others will perform their proper functions—that is, plow or cut their proportion of earth. One of the advantages of this coupling is that it dispenses with the rear wheel of the gang of plows in front and supports the tailpiece of the front plow on the front axle of the next plow following. This coupling also permits a shortening of the distance between the plows, so that the tandem plows will be much closer together.

Other objects and advantages will be fully explained in the following description, and the invention will be more particularly pointed out in the claims.

Reference is had to the accompanying drawings, which form a part of this application and specification.

Figure 1 is a plan view of the improved coupling, showing the front part of one gang-plow frame and the rear part of another gang of plows coupled together. Fig. 2 is a front elevation of an axle with the improved coupling mounted thereon and showing the connecting-rod in section. Fig. 3 is a side view of the connecting-rod. Fig. 4 is a plan view of a connecting-rod for use with another form of tailpiece of the gang-plow. Fig. 5 is a plan view of the sleeve which carries the rear end of the connecting-rod.

Similar reference characters are used to indicate the same parts throughout the several views.

The drawings show the front part of a Hancock plow and the rear part of a Standard plow coupled together. This coupling is provided with a connecting-rod 1, which is inserted in the bearing 2 of the tailpiece of the plow in front in the same way that the axle of the rear wheel is usually inserted. This form of connecting-rod is used when the plow in front is a Standard plow; but different forms of coupling-rods would have to be used with different plows.

Fig. 4 shows the form of a coupling or connecting rod which would have to be used if the plow in front was a Hancock plow. A cuff 3 is mounted on the axle of the front wheel of the plow in the rear, and this cuff has a bearing 10 for the horizontal part of the elbow-shaft 4, which gives a rocking motion of the elbow-shaft 4. The cuff 10 is rigidly mounted on the axle 7, being made rigid thereon by a set-screw 12. The cuff is slidable on the axle when the set-screw 12 is released. A sleeve 5 is mounted on the connecting-rod 1, and this sleeve has a bearing 6, which engages the vertical part of the elbow-shaft 4. By this means the rod 1 has a laterally-swinging motion.

The rod 1 moves freely in the sleeve 5, so that the connecting-rod 1 has longitudinal motion, which is necessary, because the distance between the plows will vary slightly, particularly in making turns, each gang of plows being drawn by a chain or cable connected to the power and the plows not being drawn by each other.

The connecting-rod 1 will hold the plows in line just as they are set or placed; but the coupling is flexible and permits making turns. The connecting-rod 1 being loosely mounted in the sleeve 5, the axle 7 is not prevented from rocking laterally, as when the wheel on one side of one of the plows runs in a low place or hole in the ground or on uneven ground. The elbow-shaft 4 is provided with suitable keys 8. Attention is called to the fact that the connecting-rod 1 is not laterally movable on the axle or relative to the axle 7, but simply has a rocking motion on the upright part of the shaft 4. The rod 1 has also a rocking motion laterally in the bearing 2 in the tailpiece of the plow in front. The form of this tailpiece 9 differs in different makes of plows. Hence a different form of connecting-rod will be necessary. The bearing 10 for the horizontal portion of shaft 4 has a lip 11 projecting under the shaft 4 to provide a rest for the shaft 4.

Having fully described my invention, what I claim as new, and desire to secure by Letters Patent, is—

1. A coupling for connecting plows tandem comprising a connecting-rod pivotally connected to the plow in front and a bearing for said rod having a horizontally and a vertically pivotal connection with and supported by the plow in the rear.

2. A coupling for connecting plows tandem comprising a connecting-rod pivotally connected to the plow in front and a bearing engaging said rod loosely and having a horizontally-pivoted connection and a vertically-pivoted connection with the plow in the rear.

3. A coupling for connecting wheeled plows tandem comprising a connecting-rod, an elbow-shaft, a cuff mounted on the axle of the rear plow and provided with a bearing for the horizontal part of said elbow-shaft, and a sleeve engaging said connecting-rod loosely and provided with a bearing for the vertical part of said elbow-shaft, said connecting-rod being pivotally connected to the rear of the plow in front.

4. A coupling for connecting wheeled plows tandem comprising a connecting-rod pivotally connected to the rear of a plow in front, a cuff mounted on the axle of a plow in the rear, a sleeve loosely mounted on said connecting-rod, and a flexible connection for said cuff and said sleeve.

5. In wheeled plows connected tandem, the rear of the plow in front being adjacent to the axle of the plow in the rear; a rod pivotally connected to the rear of the plow in front and a bearing for said rod carried by said axle and consisting of a vertically and laterally pivoted connection for supporting the rear of the plow in front on the axle of the plow in the rear.

In testimony whereof I set my hand, in the presence of two witnesses, this 8th day of December, 1905.

JOHN L. M. BROOKS.

Witnesses:
A. L. JACKSON,
J. W. STITT.